United States Patent
Desai et al.

(10) Patent No.: US 12,267,584 B2
(45) Date of Patent: Apr. 1, 2025

(54) IMAGE SIGNAL PROCESSOR SUPPORTING MULTIPLE SECURITY DOMAINS ON A SHARED PHYSICAL LINK

(71) Applicant: QUALCOMM Incorporated, San Diego, CA (US)

(72) Inventors: Rohan Desai, San Diego, CA (US); Dafna Shaool, Binyamina (IL); Zeeshan Asad Sardar, Woodbridge (CA); Sumant Paranjpe, San Diego, CA (US); Abhay Raut, San Diego, CA (US); Rajakumar Govindaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 18/069,100

(22) Filed: Dec. 20, 2022

(65) Prior Publication Data

US 2024/0205539 A1 Jun. 20, 2024

(51) Int. Cl.
G06F 21/00 (2013.01)
G06F 21/60 (2013.01)
G06F 21/74 (2013.01)
H04N 23/45 (2023.01)
H04N 23/60 (2023.01)
H04W 12/086 (2021.01)

(52) U.S. Cl.
CPC ......... H04N 23/665 (2023.01); G06F 21/606 (2013.01); G06F 21/74 (2013.01); H04N 23/45 (2023.01); H04W 12/086 (2021.01)

(58) Field of Classification Search
CPC .... H04N 23/665; H04N 23/45; G06F 21/606; G06F 21/74; H04W 12/086; H04W 12/08; H04L 63/105
See application file for complete search history.

(56) References Cited

U.S. PATENT DOCUMENTS

| | | | |
|---|---|---|---|
| 2014/0157349 A1* | 6/2014 | Robinson | H04L 67/54 726/1 |
| 2018/0007023 A1* | 1/2018 | Chakrabarti | H04L 9/0819 |
| 2022/0083678 A1* | 3/2022 | Divakaran | G06F 3/0488 |
| 2024/0193789 A1* | 6/2024 | Bandwar | H04N 23/682 |

OTHER PUBLICATIONS

International Search Report and Written Opinion—PCT/US2023/081080—ISA/EPO—Feb. 16, 2024.

* cited by examiner

*Primary Examiner* — Kendall Dolly
(74) *Attorney, Agent, or Firm* — QUALCOMM Incorporated

(57) ABSTRACT

This disclosure provides systems, methods, and devices for wireless communication that support improved routing of image sensors that share a PHY within different secure domains. In a first aspect, a device may receive a packet from an image sensor along a physical data connection. The device may determine a virtual channel associated with the packet and may determining a secure domain for the packet based on the virtual channel. The first secure domain may be selected from a plurality of secure domains accessible via the physical data connection, such as based on a mapping maintained by the device. The device may then route the packet within the first secure domain such that further processing and storage of the packet occurs within the first secure domain, such as within a context base associated with the first secure domain. Other aspects and features are also claimed and described.

28 Claims, 5 Drawing Sheets

IMAGE SIGNAL PROCESSOR SUPPORTING MULTIPLE SECURITY DOMAINS ON A SHARED PHYSICAL LINK

TECHNICAL FIELD

Aspects of the present disclosure relate generally to image processing, and more particularly, to receiving and routing data packets from image sensors. Some features may enable and provide improved image processing, including receiving and routing data packets within different secure domains.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

The increasing amount of image data captured by the image capture device has some negative effects that accompany the increasing resolution obtained by the additional image data. Additional image data increases the amount of processing performed by the image capture device in determining image frames and videos from the image data, as well as in performing other operations related to the image data. For example, the image data may be processed through several processing blocks for enhancing the image before the image data is displayed to a user on a display or transmitted to a recipient in a message. Each of the processing blocks consumes additional power proportional to the amount of image data, or number of megapixels, in the image capture. The additional power consumption may shorten the operating time of an image capture device using battery power, such as a mobile phone.

Image sensors may communicate with other components of an image capture device, such as an image signal processor, using one or more physical data connections. In certain instances, the amount of data being transmitted or the number of image sensors that need to be communicated with may be limited by the capacity of the physical data connections.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Techniques for improved routing of data packets received from image sensors are provided. In particular, techniques are provided that enable the routing of data packets from multiple image sensors that are received via the same PHY to be routed to different secure domains. Virtual channels for received data packets may be mapped to corresponding secure domains, which may change over time depending on the applications accessing the image sensors. Data and applications utilizing particular secure domains may be prevented from accessing or writing to other secure domains. In particular, based on the virtual channel for a packet, a corresponding secure domain may be determined, and the ISP may enable the packet to be routed within the secure domain, such as by writing the contents of the packet to a corresponding context base for the secure domain.

These techniques enable the routing of data packets from multiple image sensors to different secure domains even if the image sensors communicated using the same PHY. Such implementations may improve the security of image processing, such as by protecting against data leakage between applications accessing different cameras on the same PHY or data leakage between multiple applications accessing the same camera. Such techniques may also improve the flexibility, cost, and complexity of image processing systems, as secure deployments that rely on fewer PHYs are still possible without adding additional PHYs.

In one example application, vehicles include several cameras that may share a common physical PHY link and also support different domains and use cases. For example, an in-cabin driver-facing camera may be used for face authentication, driver monitoring, and video call functions governed by different software domains, with each domain having different security restrictions. Aspects of this disclosure include virtual channels within an image signal processor as a path-based approach to support multiple security domains sharing a common physical PHY link. The sharing of a PHY link reduces area and cost in the image signal processor compared to having different physical paths for each security domain. Identifiers for data, formatted as packets in some embodiments, identify different domain IDs and segment image data and image statistics within different system memory context banks for content protection. In some embodiments, each security domain may be further divided into sub-domains for carrying image data in a first sub-domain and image metadata in a second sub-domain of each security domain.

Each virtual channel may have a specific assigned context bank in a secure storage unit. Different cameras within a vehicle may be assigned different security domains. For example, the driver monitoring and/or authentication cameras may have a first security domain and cameras capturing the vehicle surroundings may have a second security domain. As another example, the driver monitoring cameras may have a first security domain, authentication cameras may have a second security domain, and cameras capturing the vehicle surroundings may have a third security domain. Although vehicle applications are described, other combinations of cameras on other devices may be assigned different security domains. For example, a mobile computing device may have authentication cameras in a first security domain and photography cameras in a second security domain.

When the virtual channels are implemented in an image signal processor, hardware in the image signal processor may be shared between security domains and/or specifically assigned to a security domain. For example, an image signal processor may include multiple image front ends (IFEs) in which the IFEs are assigned to a first security domain or a second security domain in a fixed manner or through a dynamic reallocation.

In one aspect, the techniques described herein relate to an apparatus including an image signal processor and a memory. The memory may store instructions which, when executed by the image signal processor, cause the processor to receive a packet from an image sensor along a physical data connection and determine a virtual channel associated with the packet. The image processor may also determine, based on the virtual channel, a first secure domain for the packet and route the packet within the first secure domain. The first secure domain may be selected from a plurality of secure domains accessible via the physical data connection.

In another aspect, the techniques described herein relate to a method that includes receiving, by an image signal processor, a packet from an image sensor along a physical data connection and determining, by the image signal processor, a virtual channel associated with the packet. The method may also include determining, by the image signal processor based on the virtual channel, a first secure domain for the packet and routing, by the image signal processor, the packet within the first secure domain. The first secure domain may be selected from a plurality of secure domains accessible via the physical data connection.

In another aspect, the techniques described herein relate to a non-transitory, computer-readable medium storing instructions which, when executed by an image signal processor, cause the image signal processor to receive a packet from an image sensor along a physical data connection and determine a virtual channel associated with the packet. The instructions may further cause the image signal processor to determine, based on the virtual channel, a first secure domain for the packet and route the packet within the first secure domain. The first secure domain may be selected from a plurality of secure domains accessible via the physical data connection.

In some aspects, the techniques described herein relate to an image capture device including a first image sensor, a second image sensor, an image signal processor, a first shared physical link coupling the first image sensor to the image signal processor and coupling the second image sensor to the image signal processor, and a memory. The memory may store instructions which, when executed by the image signal processor, cause the image signal processor to receive a packet from an image sensor along a physical data connection and determine a virtual channel associated with the packet. The instructions may further cause the image signal processor to determine, based on the virtual channel, a first secure domain for the packet and route the packet within the first secure domain. The first secure domain is selected from a plurality of secure domains accessible via the physical data connection.

Methods of image processing described herein may be performed by an image capture device and/or performed on image data captured by one or more image capture devices. Image capture devices—devices that can capture one or more digital images whether still image photos or sequences of images for videos—can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices, such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multiframe noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis, and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
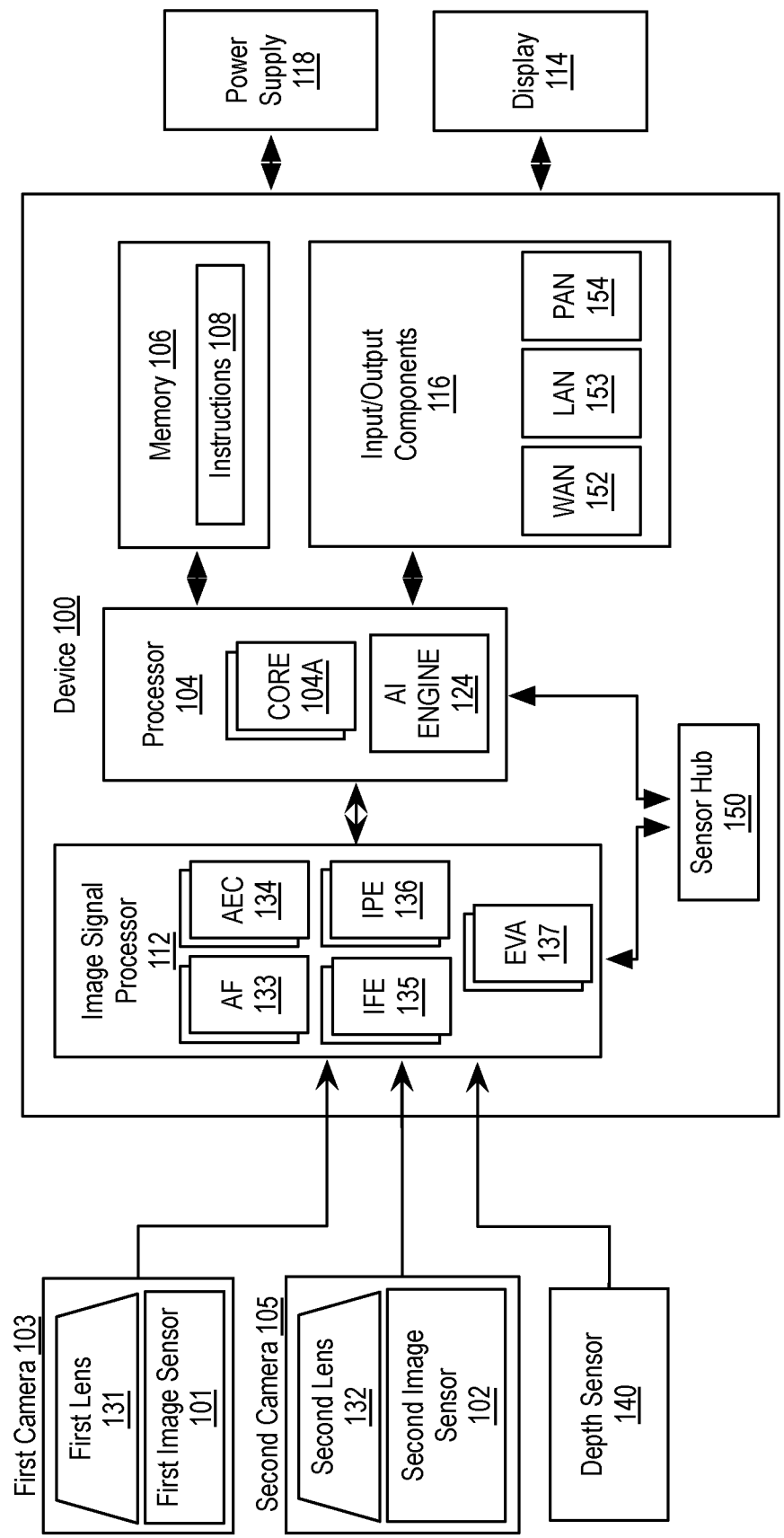
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

As the number of concurrent cameras connected to individual computing devices increases, such as for mobile, automotive, and XR devices, it may be necessary to share more physical resources between multiple cameras. For example, physical data connections (e.g., a CSI PHY) may be shared by multiple image sensors. These PHYs may transmit data between the image sensors and an ISP. Data received from the image sensors may be sensitive in nature and it may be advantageous to ensure that data from one camera is not routed to an application used by another camera.

In such instances, it may be beneficial to implement multiple security domains within an ISP. Certain PHY-based security schemes may be limited to assigning all image sensors on one PHY to the same security domain, which may limit the number of security domains to the number of PHYs on the device. However, PHYs are an expensive resource and it is accordingly not always feasible or pragmatic to have a separate PHY for each image sensor or each desired secure domain. Accordingly, in instances where there is a need for more security domains than there are PHY links, alternative techniques for implementing security domains are necessary. In particular, it may be necessary to support separate security domains for cameras that operate on a single PHY link such that data from separate cameras does not leak into applications for other cameras.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits and be used in applications other than those described above.

The present disclosure provides systems, apparatus, methods, and computer-readable media that support image processing, including techniques for routing data packets from multiple image sensors to different secure domains, even when the image sensors utilize the same PHY. In particular, techniques are provided that enable the routing of data packets from multiple image sensors that are received via the same PHY to be routed to different secure domains. Virtual channels for received data packets may be mapped to corresponding secure domains, which may change over time depending on the applications accessing the image sensors. Data and applications utilizing particular secure domains may be prevented from accessing or writing to other secure domains. In particular, based on the virtual channel for a packet, a corresponding secure domain may be determined, and the ISP may enable the packet to be routed within the secure domain, such as by writing the contents of the packet to a corresponding context base for the secure domain.

Particular implementations of the subject matter described in this disclosure may be implemented to realize one or more of the following potential advantages or benefits. In some aspects, the present disclosure provides techniques that enable the routing of data packets from multiple image sensors to different secure domains, even if the image sensors communicated using the same PHY. Such implementations may improve the security of image processing, such as by protecting against data leakage between applications accessing different cameras one the same PHY or data leakage between multiple applications accessing the same camera. Such techniques may also improve the flexibility, cost, and complexity of image processing systems, as secure deployments that rely on fewer PHYs are still possible without adding additional PHYs.

An example device for capturing image frames using one or more image sensors, such as a smartphone, may include a configuration of one, two, three, four, or more cameras on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames in a memory and/or otherwise provide the output image frames to processing circuitry (such as through a bus). The processing circuitry may perform further processing, such as for encoding, storage, transmission, or other manipulation of the output image frames.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the description of embodiments herein, numerous specific details are set forth, such as examples of specific components, circuits, and processes to provide a thorough understanding of the present disclosure. The term "coupled," as used herein, means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally, in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame" and "corrected image frame" may refer to image frames that have been processed by any of the discussed techniques. Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that, throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like refer to the actions and processes of a computer system or similar electronic computing device that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons.

I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands.

The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and/or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first camera 103 and second camera 105, respectively. In another embodiment, a wire interface couples the image signal processor 112 to an external image sensor. In a further embodiment, a wireless interface couples the image signal processor 112 to the image sensors 101, 102.

The first camera 103 may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The camera 103 may be a variable aperture (VA) camera in which the aperture can be controlled to a particular size. Example aperture sizes are f/2.0, f/2.8, f/3.2, f/8.0, etc. Larger aperture values correspond to smaller aperture sizes, and smaller aperture values correspond to larger aperture sizes. The camera 103 may have different characteristics based on the current aperture size, such as a different depth of focus (DOF) at different aperture sizes.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112, and output from the depth sensors are processed in a similar manner to that of image sensors 101 and 102. Example depth sensors include active sensors, including one or more of indirect Time of Flight (iToF), direct Time of Flight (dToF), light detection and ranging (Lidar), mmWave, radio detection and ranging (Radar), and/or hybrid depth sensors, such as structured light. In embodiments without a depth sensor 140, similar information regarding depth of objects or a depth map may be generated in a passive manner from the disparity between two image sensors (e.g., using depth-from-disparity or depth-from-stereo), phase detection auto-focus (PDAF) sensors, or the like. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), one or more auto exposure compensation (AEC) 134 engines, and/or one or more engines for video analytics (EVAs). The AF 133, AEC 134, IFE 135, IPE 136, and EVA 137 may each include application-specific circuitry, be embodied as software code executed by the ISP 112, and/or a combination of hardware and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system-on-chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including packet routing operations. For example, execution of the instructions can instruct the image signal processor 112 to begin or end capturing an image frame or a sequence of image frames, in which the capture includes routing packets from multiple image sensors to various secure domains, as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, a camera application executing on processor 104 may receive a user command to begin a video preview display, upon which a video comprising a sequence of image frames is captured and processed from one or more image sensors 101 or 102 through the image signal processor 112. Image processing to generate "output" or "corrected" image frames, such as according to techniques described herein, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124 or other co-processor) to offload certain tasks from the cores 104A. The AI engine 124 may be used to offload tasks related to, for example, face detection and/or object recognition. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to improve the processing and security of data received from image sensors by enabling the routing of data packets from different image sensors to be routed to different secure domains, even if the image sensors utilize the same PHY. One example method of operating one or more cameras, such as camera 103, is shown in FIG. 2 and described below.

Figure 2:
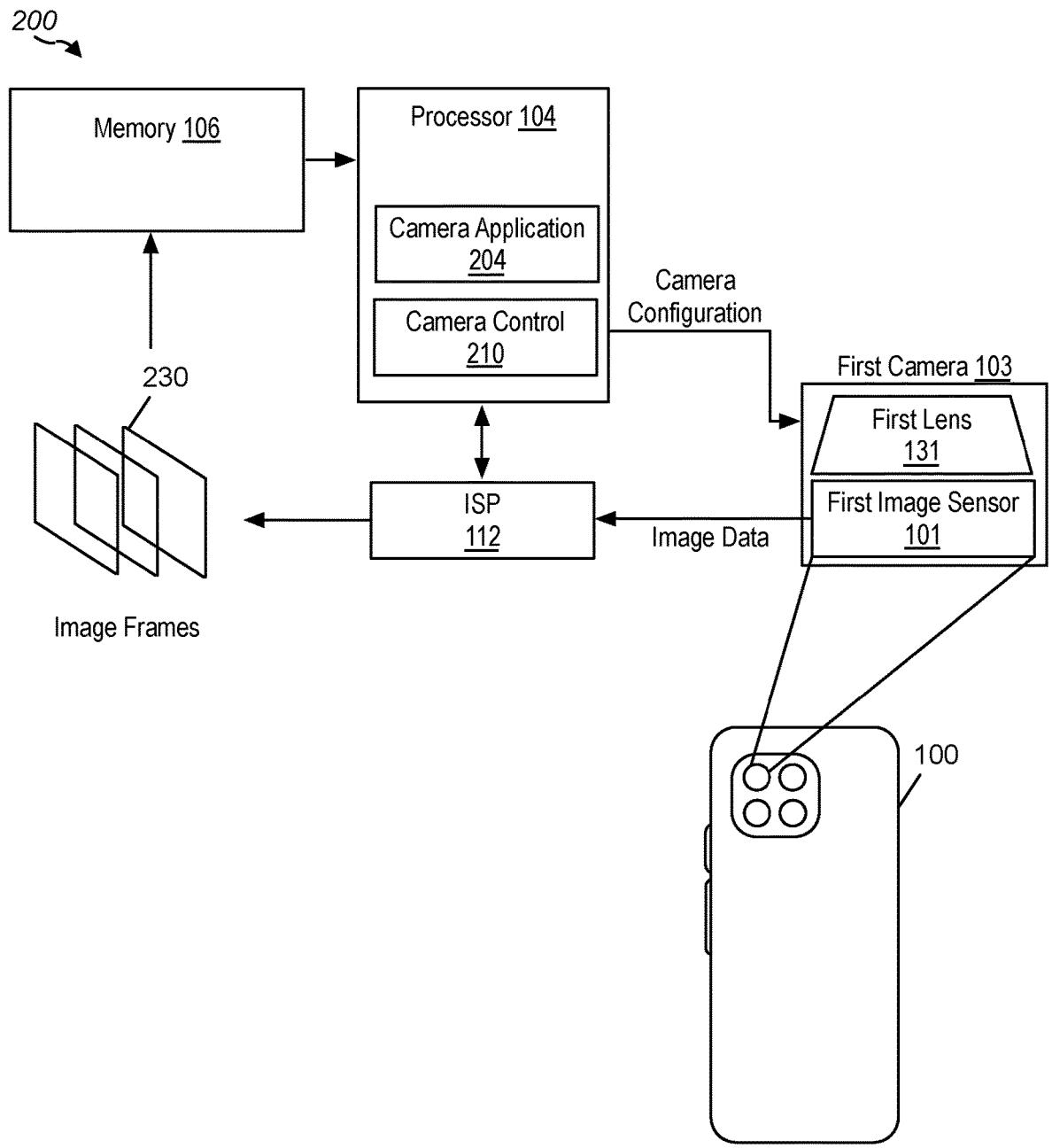
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosure. A processor 104 of system 200 may communicate with image signal processor (ISP) 112 through a bi-directional bus and/or separate control and data lines. The processor 104 may control camera 103 through camera control 210, such as for configuring the camera 103 through a driver executing on the processor 104. The camera control 210 may be managed by a camera application 204 executing on the processor 104, which provides settings accessible to a user such that a user can specify individual camera settings or select a profile with corresponding camera settings. The camera control 210 communicates with the camera 103 to configure the camera 103 in accordance with commands received from the camera application 204. The camera application 204 may be, for example, a photography application, a document scanning application, a messaging application, or other application that processes image data acquired from camera 103.

The camera configuration may include parameters that specify, for example, a frame rate, an image resolution, a readout duration, an exposure level, an aspect ratio, an aperture size, etc. The camera 103 may obtain image data based on the camera configuration. For example, the processor 104 may execute a camera application 204 to instruct camera 103, through camera control 210, to set a first camera configuration for the camera 103, to obtain first image data from the camera 103 operating in the first camera configuration, to instruct camera 103 to set a second camera configuration for the camera 103, and to obtain second image data from the camera 103 operating in the second camera configuration.

In some embodiments in which camera 103 is a variable aperture (VA) camera system, the processor 104 may execute a camera application 204 to instruct camera 103 to configure to a first aperture size, obtain first image data from the camera 103, instruct camera 103 to configure to a second aperture size, and obtain second image data from the camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 is a larger aperture size than f/8.0.

The image data received from camera 103 may be processed in one or more blocks of the ISP 112 to form image frames 230 that are stored in memory 106 and/or provided to the processor 104. The processor 104 may further process the image data to apply effects to the image frames 230. Effects may include Bokeh, lighting, color casting, and/or high dynamic range (HDR) merging. In some embodiments, functionality may be embedded in a different component, such as the ISP 112, a DSP, an ASIC, or other custom logic circuit for performing the additional image processing.

Figure 3:
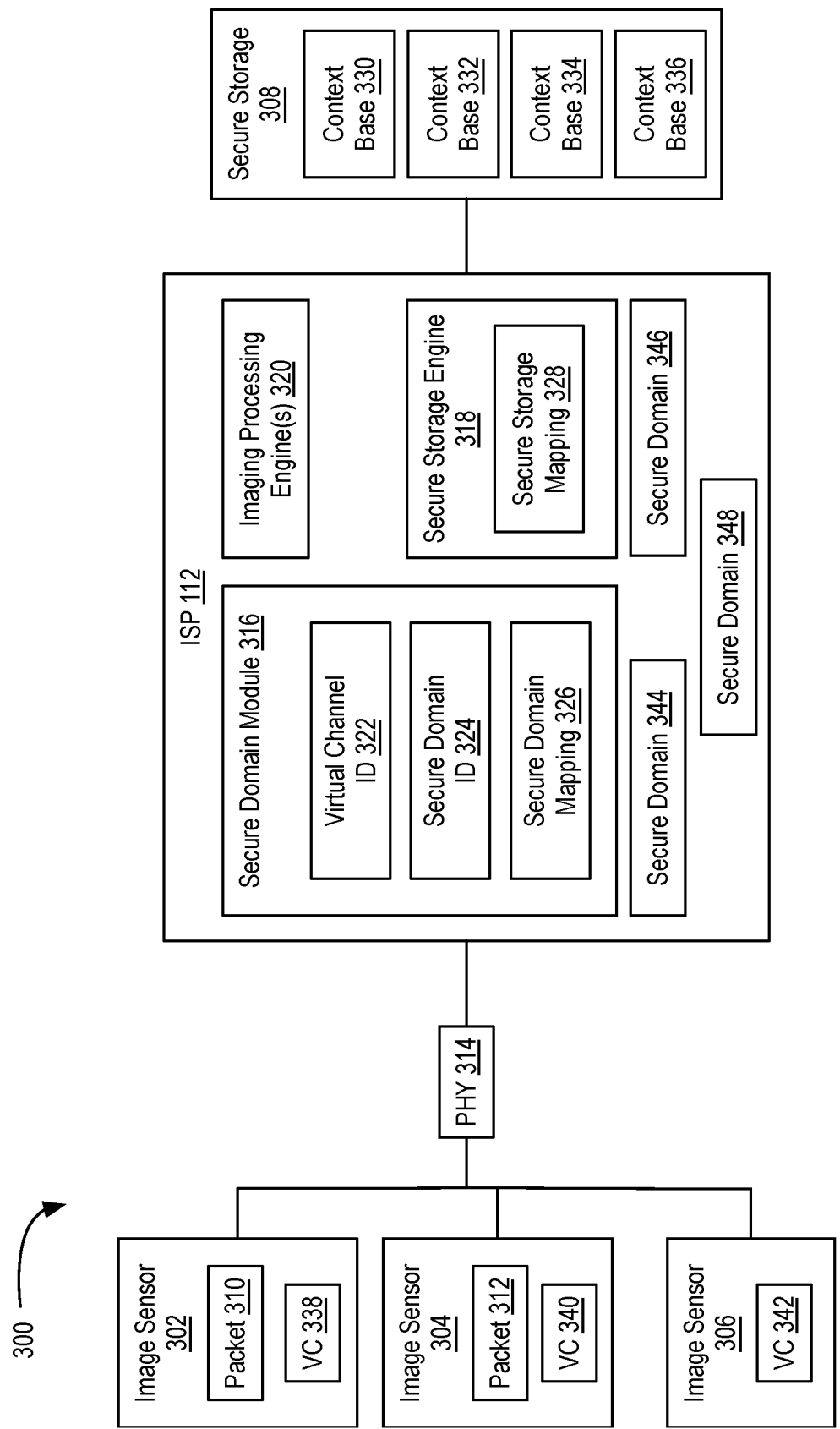
FIG. 3 depicts a system for routing packets received from image sensors according to one aspect of the present disclosure.

FIG. 3 depicts a system 300 for routing packets received from image sensors according to one aspect of the present disclosure. In particular, the system 300 may be configured to route packets received from image sensors through different secure domains, even when the packets originate from multiple image sensors via the same PHY. The system 300 includes image sensors 302, 304, 306, a PHY 314, an ISP 112, and a secure storage 308. The image sensors 302, 304 include packets 310, 312 for transmission, such as stored in a buffer. The ISP 112 includes a secure domain module 316, a secure storage engine 318, an image processing engine 320. The secure domain module 316 includes a virtual channel identifier 322, a secure domain identifier 324, and a secure domain mapping 326. The secure storage engine 318 includes a secure storage mapping 328. The secure storage 308 includes context bases 330, 332, 334, 336.

The ISP 112 may be configured to receive packets 310, 312 from the image sensors 302, 304, 306 along the PHY 314. In certain implementations, the packets 310, 312 contains image data captured by the image sensors 302, 304. For example, the packet 310 may contain image data captured by the image sensor 302 and the packet 312 may contain image data captured by the image sensor 304. The packets 310, 312 may also contain additional information (e.g., metadata for an image, an identifier of the image sensors 302, 304, 306, a virtual channel identifier). In certain implementations, the image data may be encoded according to various formats, such as high dynamic range (HDR) image data, raycasting game maker (RGM) image data, and YUV image data. In certain implementations, the PHY 314 may represent a PHY layer connection corresponding to a particular, physical data pathway between the image sensors 302, 304, 306 and the ISP 112. In certain implementations, the PHY 314 may represent a PHY layer connection corresponding to a particular, physical data pathway between one or more image sensors 302, 304, 306 and the ISP 112. In certain implementations, during operation, packets received from the image sensors may be serialized into a single data feed transmitted along the PHY 314 to the image signal processor 112, which may deserialize the data feeds to separate data from the different image sensors 302, 304, 306 for further processing, such as image processing, processing within corresponding secure domains.

In various implementations, the image sensors 302, 304, 306 may include one or more of a dashcam, an occupancy camera, a driver facing camera, exterior cameras, and the like. These cameras may be used for different applications that require different levels of security. For example, the image sensor 302 may correspond to an exterior camera that requires a low level of security while in operation, the image sensor 304 may correspond to a driver-facing camera that captures biometric information of the driver and thus requires a high level of security, and the image sensor 306 may correspond to an occupancy camera that requires a medium level of security. In certain implementations, one or more of the image sensors 302, 304, 306 may change uses over time. For example, the image sensor 304 may initially be used to capture biometric data regarding a driver to verify that the driver is authorized to use the vehicle and may later be used by a different application for driver monitoring (such as for drowsiness or distraction detection). As another example, the image sensor 302 may be a front-facing smartphone camera and may be used for biometric verification of a user and later used to take a selfie image.

The ISP 112 may be configured to determine a virtual channel 338, 340, 342 associated with the packet 310, 312. In certain implementations, the virtual channel 338, 340, 342 represents a virtual communication pathway between a particular image sensor 302, 304, 306 and the ISP 112 (e.g., via the PHY 314). In particular, the virtual channel 338, 340, 342 may represent a virtual communication pathway from the image sensor 302, 304, 306, through the PHY 314, through one or more processing steps within the ISP, and to a final destination, such as an application executing on a processor 104 of the device 100. In other implementations, the virtual channel 338, 340, 342 may represent a virtual communication pathway from the image sensor 302, 304, 306 to the ISP 112 (e.g., to one or more processing components of the ISP 112). For example, the virtual channel 338 may represent a virtual communication pathway from the image sensor 302 to the ISP 112, the virtual channel 340 may represent a virtual communication pathway from the image sensor 304 to the ISP 112, and the virtual channel 342 may represent a virtual communication pathway from the image sensor 306 to the ISP 112. In certain implementations, the image sensor 302, 304, 306 adds a virtual channel identifier 322 to the packet 310, 312 to indicate which virtual channel 338, 340, 342 the packet 310, 312 corresponds to. In such instances, the virtual channel 338, 340, 342 may be identified based on the virtual channel identifier 322. For example, the virtual channel 338, 340, 342 may be identified as the contents of the virtual channel identifier 322. In certain implementations, the image sensor 302, 304, 306 may be one of a plurality of image sensors 302, 304, 306 and the virtual channel identifier 322 identifies the image sensor 302, 304, 306 from among the plurality of image sensors 302, 304, 306. For example, as explained above, packets 310, 312 from the image sensors 302, 304, 306 may be serialized for transmission along the PHY 314 and the virtual channel identifier 322 may be used to identify and distinguish between packets 310, 312 received from different image sensors 302, 304, such as when the ISP 112 deserializes data received along the PHY 314.

The ISP 112 may be configured to determine, based on the virtual channel 338, 340, 342, secure domains 344, 346, 348 for the packets 310, 312. The secure domains 344, 346, 348 may be selected from a plurality of secure domains 344, 346, 348 available within the ISP 112. In certain implementations, the secure domains 344, 346, 348 may be isolated data stream that are protected from access by data packets 310, 312 and computing processes that are not part of the same secure domain. In certain implementations, secure domains represent isolated data streams of data packets 310, 312 from image sensors 302, 304, 306, through a processing pipeline within the ISP 112, and to a final destination. The processing pipeline may include processing by one or more image processing engines 320 within the ISP 112. For example, the image processing engine 320 may include one or more image processing procedures, such as image front end processing procedures, that alter or combine image data from one or more image frames. Final destinations for the packets 310, 312 may include storage within a secure storage 308, processing by a computing process executing on another processor such as the processor 104, and the like.

In certain implementations, a particular secure domain, such as the secure domain 344, may be isolated (1) to ensure data from other secure domains 346, 348 or computing processes cannot access the secure domain 344 and/or (2) to ensure that data within the particular secure domain 344 does not leave the secure domain 344, such as by overriding an assigned memory space, by violating corresponding hardware functionality, by deviating from a corresponding processing pipeline within the ISP 112, and the like. In certain implementations, the secure domains 344, 346, 348 may correspond to various types of applications or use cases, such as handling biometric data, detecting and processing QR codes, processing and transmitting content protected by digital rights management (DRM), and the like. In various instances, each application requesting access to one of the image sensors 302, 304, 306 may have its own corresponding secure domain 344, 346, 348. In other instances, one or more applications may share the same secure domain 344, 346, 348. For example, applications with higher security requirements may request or require separate secure domains 344, 346, 348, while other applications may not include such a request or requirement. In such instances, the other applications may share a single secure domain 344, 346, 348.

In certain implementations, the secure domains 344, 346, 348 are implemented by at least one secure data storage device, such as the secure storage 308. In such instances, each secure domain 344, 346, 348 may be implemented by a corresponding portion of the secure storage 308. For example, data contained within the secure domains 344, 346, 348 may be stored within context bases 330, 332, 334, 336 contained within the secure storage 308. For instance, the secure domain 344 may correspond to the context base 330, the secure domain 346 may correspond to the context base 332, and the secure domain 348 may correspond to the context base 334. In certain implementations, the context bases 330, 332, 334, 336 may be implemented within separate portions of the secure storage 308, such as separate address spaces within the secure storage 308. In certain implementations, the at least one secure storage 308 may include a secure memory management unit (SMMU) configured to restrict access to the secure storage 308, such as via a secure storage engine 318. For example, the context bases 330, 332, 334, 336 may be implemented as restricted address spaces that are separated within the secure storage 308, such as with a separation of 2 kB or more. A size of the context bases 330, 332, 334, 336 may be predetermined such that all of the context bases 330, 332, 334, 336 are the same size. The size of the context bases 330, 332, 334, 336 may additionally or alternatively be dynamically assigned, such as based on a type of application associated with the secure domain or based on a size indicated within a request received from the requesting application. In certain implementations, other types of secure storage and/or memory protection may be used, such as separate data transmission routes within the ISP 112 that are hardware limited to only access certain parts of memory, air gaps between different context bases, such as separate memory chips for one or more of the secure domains, and the like.

In particular, a secure domain module 316 may determine, for received packets 310, 312, which secure domains 344, 346, 348 corresponds to the virtual channels 338, 340, 342 of the packets 310, 312. For example, the secure domain module 316 may receive or maintain a secure domain mapping 326 that identifies corresponding secure domains for one or more of the virtual channels 338, 340, 342. In certain implementations, the secure domain mapping 326 may store associations between virtual channel identifiers 322 for particular virtual channels 338, 340, 342 and secure domain identifiers 324 for particular secure domains 344, 346, 348. In certain implementations, determining corresponding secure domains 344, 346, 348 for received packets 310, 312, 314 may include identifying corresponding secure domain identifiers 324 for virtual channel identifiers 322 extracted from the packets 310, 312.

To maintain the secure domain mapping 326, the ISP 112, such as the secure domain module 316 may receive a request from an application to access an image sensor 302, 304, 306. In response, the secure domain module 316 may grant access to the image sensor 302, 304, 306 and may store, within the secure domain mapping 326, a mapping between the virtual channel identifier 322 for the image sensor 302, 304, 306 and a domain identifier 324 for a secure domain 344, 346, 348 utilized by the requesting application. In certain implementations, the secure domain module 316 may determine that the requesting application corresponds to a particular secure domain 344. For example, the request may include an identifier of a corresponding secure domain 344. In certain implementations, the requesting application may not have a corresponding secure domain. In such instances, the secure domain module 316 may create a new secure domain, such as by creating a new context base 336 within the secure storage 308 and a new secure domain ID, and may store a mapping between the requesting application and the new secure domain ID.

In certain implementations, the mappings between virtual channels 338, 340, 342 and secure domains 344, 346, 348 may change over time, and secure domains may be created or deleted depending on operating conditions. For example, different applications may access the same image sensor 302, 304, 306 at different times, as explained above. In such instances, when a request is received to access an image sensor 302 that already has a corresponding secure domain 344, the existing secure domain 344 may be deleted, such as by deleting the contents of a corresponding context base 330 and a corresponding association in the secure domain mapping 326, and a new association may be made for the virtual channel 338 corresponding to the image sensor 302, such as by creating a new secure domain or by storing an association between an existing secure domain 346, 348 and the virtual channel 338.

Requests to store data within context bases 330, 332, 334, 336 within the secure storage 308 may be validated by the secure storage engine 318. For example, the secure storage engine 318 may be configured to receive read/write requests for the secure storage 308 that contain virtual channel identifiers 322 and secure domain identifiers 324 and may grant or deny the requests based on whether the correct identifiers 322, 324 are provided. For example, the secure storage engine 318 may maintain or have access to a copy of the secure domain mapping 326 and may compare received identifiers 322, 324 to ensure that the received virtual channel identifier 322 and the received secure domain identifier 324 correspond to one another after receiving a read/write request. If so, read/write access to the secure storage 308 may be provided, such as via an SMMU of the secure storage 308. In particular, the secure storage engine 318 may identify, within a secure storage mapping 328, a corresponding portion of the secure storage 308 for the context base 330 that corresponds to the secure domain identifier 324. If the identifiers 322, 324 do not correspond, the secure storage engine 318 may reject the request. For example, the secure storage engine 318 may provide an invalid domain ID to the secure storage mapping 328 or an SMMU of the secure storage 308, which may cause the request to be blocked or may cause the data to be written to a sequestered/quarantined memory space within the secure storage 308 or another storage device.

In certain implementations, one or more of the image sensors 302, 304, 306 or virtual channels 338 may have no associated secure domains. For example, the one or more image sensors 302, 304, 306 may not be actively accessed by any applications at a particular time. All requests from those virtual channels at that time may accordingly be rejected. In certain implementations, after an application has stopped accessing an image sensor 302, 304, 306, the secure domain module 316 may delete a current secure domain 344, 346, 348 association for the corresponding virtual channel 338, 340, 342, such as by deleting the mapping within the secure domain mapping 326. This may prevent incursion into previous secure domains by new computing processes. For example, a compromised data feed from an image sensor 302, 304, 306, or other application trying to access the sensor's previous secure domain 344, 346, 348, may be blocked because no mapping exists for read/write requests to be routed to a corresponding context base 330, 332, 334, 336.

In certain implementations, access to the image sensors 302, 304, 306 by applications executing on the device 100 may be controlled by a driver. In such instances, identifying the corresponding secure domain 344, 346, 348 for a received packet 310, 312 may be performed by the driver. For example, all or part of the functionality of the secure domain module 316 and the secure storage engine 318 may be performed by the driver, such as by the driver executing on the ISP 112.

The ISP 112 may be configured to route the packets 310, 312 within corresponding secure domains. For example, routing the packets 310, 312 may include storing the packets 310, 312 within corresponding context bases 330, 332, 334, 336 within the secure storage 308. In particular, the packet 310 may be stored in the context base 330 and the packet 312 may be stored in the context base 332, such as via the secure storage engine 318 as described above. In certain implementations, routing the packets 310, 312 within the secure domains 344, 346, 348 may include performing image processing on the data packet 310, 312 without leaving the secure domain 344, 346, 348. In particular, image processing may be performed by image processing engines 320 on image data contained with the packets 310, 320 without leaving the secure domains 344, 346, 348. In such instances, the image processing engine 320 may be configured to read the data from corresponding context bases 330, 332, 334, 336 and to write resulting data do the corresponding context bases 330, 332, 334, 336, such as after completing each stop of the image process.

As mentioned above, the at least one secure storage 308 may include an SMMU configured to restrict access to the secure storage 308. In such instances, routing packets 310, 312 within the secure domains 344, 346, 348 may include validating access to the corresponding context bases 330, 332, 334, 336 with the secure storage 308. For example, as explained above, routing a packet 310 may include providing a secure domain identifier 324 for a corresponding secure domain 344 of the packet 310 to the SMMU, such as via the secure storage engine 318. A corresponding portion of the secure storage 308 that contains the corresponding context base 330 may then be accessed if the secure domain identifier 324 is correct, such as based on the above-described verification process. The corresponding portion of the secure storage 308 may be determined based on a secure storage mapping 328. Once access is granted, the data packet 310, 312 may be written, such as via the secure storage engine 318, to the secure storage 308.

In certain implementations, the above-described techniques may be repeated for multiple data packets 310, 312 received from multiple image sensors 302, 304, 306. For example, data packets 310, 312 may be received within a serialized data stream via the PHY 314 and may each be processed using the techniques above. As a specific example, the packet 310 may be first received via the PHY 314 and may be processed as described above to be routed to the secure domain 344 and stored in the corresponding context base 330. The packet 312 may be received later via the PHY 314 and may be processed as described above to be routed to the secure domain 346 and stored in the corresponding context base 332.

In certain implementations, the ISP 112 may receive data from multiple PHYs, and at least a subset of the PHYs may receive data from multiple image sensors. In such instances, the ISP 112 may receive and process data from each of the PHYs using the techniques described above. In certain implementations, each of the PHYs may have a corresponding secure domain module 316 and secure storage engine 318. In other implementations, one or more of the PHYs may share a secure domain module 316 or secure storage engine 318. In such instances, the ISP 112 may include a PHY select register, which may be used to selectively receive and process data packets from one of the PHYs at a time according to the above-described techniques.

The above-described techniques accordingly enable the routing of data packets from multiple image sensors to different secure domains, even if the image sensors communicated using the same PHY. Such implementations may improve the security of image processing, such as by protecting against data leakage between applications accessing different cameras on the same PHY or data leakage between multiple applications accessing the same camera. Such techniques may also improve the flexibility, cost, and complexity of image processing systems, as secure deployments that rely on fewer PHYs are still possible without adding additional PHYs.

One skilled in the art will appreciate that the above-described implementations are merely exemplary and that, in practice, specific implementations details may differ without departing from the scope of the present disclosure. In particular, the functions of the secure domain module 316, secure storage engine 318, and image processing engine 320 may be performed by other components, such as the ISP 112 or other portions of the device 100, such as the processor 104.

Figure 4:
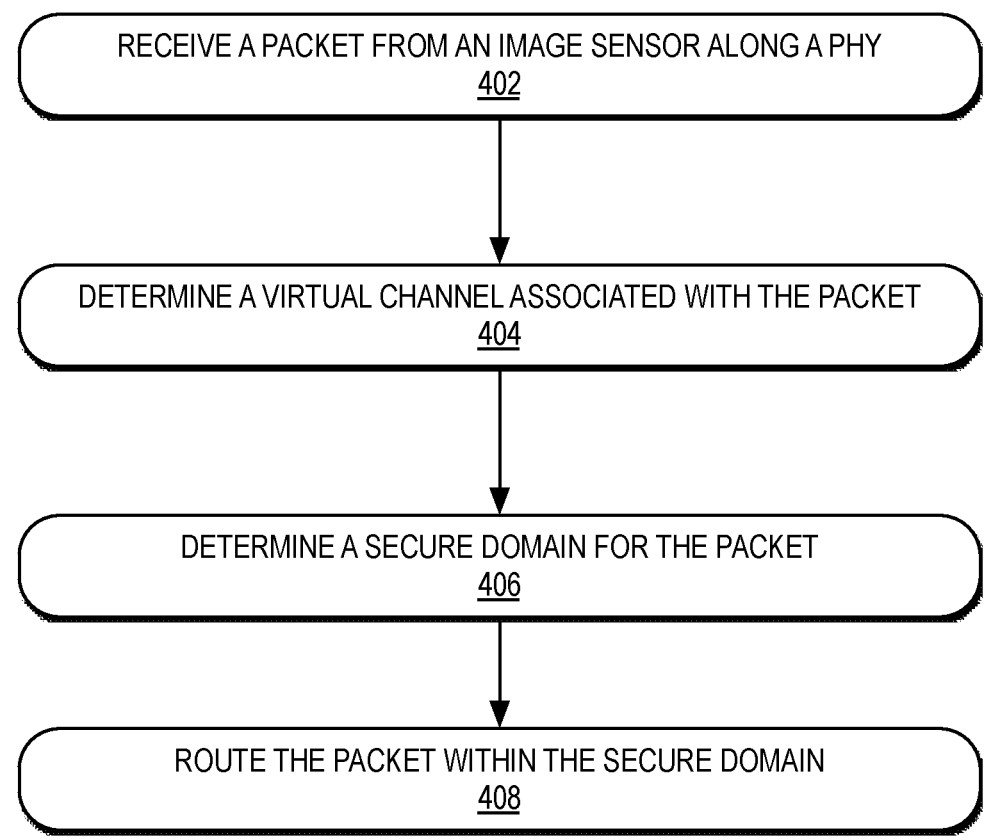
FIG. 4 shows a flow chart of an example method 400 for processing image data to receive and route data packets from different image sensors according to some aspects of the disclosure.

The systems 200, 300 may be configured to perform the operations described with reference to FIG. 4 to receive and route data packets. FIG. 4 shows a flow chart of an example method 400 for processing image data to receive and route data packets from different image sensors utilizing the same PHY according to some embodiments of the disclosure. For example, the method 400 may be performed by the ISP 112 to receive and route data packets from different image sensors utilizing the same PHY 314.

The method 400 includes receiving a packet from an image sensor along a PHY (block 402). For example, the ISP 112 may receive a packet 312 from an image sensor 304 along a PHY 314. In certain implementations, the packet 312 contains image data captured by the image sensor 304. The packet 312 may also contain additional information (e.g., a virtual channel identifier 322).

The method 400 includes determining a virtual channel associated with the packet (block 404). For example, the ISP 112 may determine a virtual channel 340 associated with the packet 312. In certain implementations, the ISP 112 may identify a virtual channel identifier 322 within the packet 312 and may determine the virtual channel 340 based on the virtual channel identifier 322. For example, the secure domain module 316 of the ISP 112 may extract the virtual channel identifier 322 from the packet 312.

The method 400 includes determining, based on the virtual channel, a secure domain for the packet (block 406). For example, the ISP 112 may determine, based on the virtual channel 340, a secure domain 346 for the packet 312. The secure domain 346 may be selected from a plurality of secure domains 344, 346, 348 accessible via the PHY 314. The secure domain 346 may be identified based on the virtual channel identifier 322. For example, the secure domain module 316 may identify a secure domain identifier 324 that corresponds to the virtual channel identifier 322 extracted from the packet 312. The secure domain identifier 324 may correspond to the current secure domain 346 for the virtual channel 340.

The method 400 includes routing the packet within the secure domain (block 408). For example, the ISP 112 may route the packet 312 within the secure domain 346. In certain implementations, routing the packet 312 may include routing contents of the packet 312 to a secure storage 308 implementing the secure domain 346. Routing the packet 312 may also include ensuring that all processing steps for the contents of the packet 312 are performed within the secure domain 346, such as by ensuring that image processing steps read from and write to a corresponding context base 332 for the secure domain 346.

Figure 5:
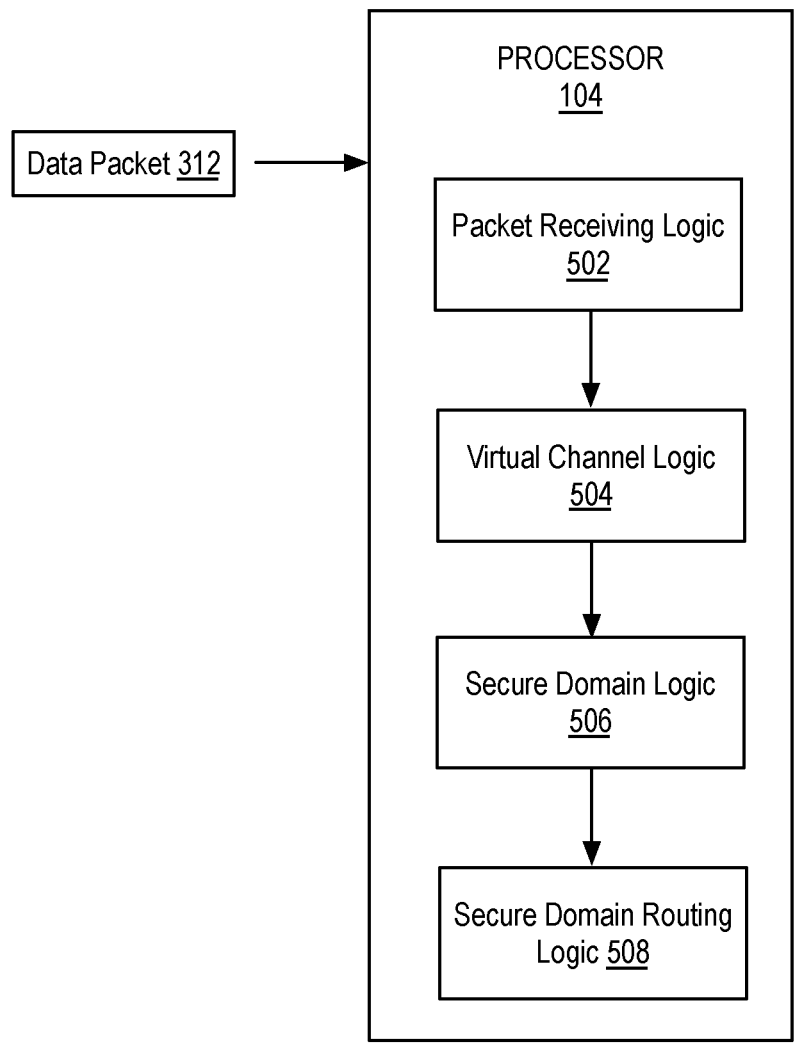
FIG. 5 is a block diagram illustrating an example processor configuration for image data processing in an image capture device according to one or more aspects of the disclosure.

FIG. 5 is a block diagram illustrating an example processor configuration for image data processing in an image capture device according to one or more embodiments of the disclosure. The processor 104, or other processing circuitry, may be configured to operate on image data, such as data packets from image sensors, to perform one or more operations of the method of FIG. 4. The image data may be processed to receive and route data packets within corresponding secure domains.

The packet receiving logic 502 may be configured to receive a packet from an image sensor along a PHY. For example, the packet receiving logic 502 may receive a packet 312 from an image sensor 304 along a PHY 314. In certain implementations, the packet 312 contains image data captured by the image sensor 304. The packet 312 may also contain additional information (e.g., a virtual channel identifier 322).

The virtual channel logic 504 may be configured to determine a virtual channel associated with the packet. For example, the virtual channel logic 504 may determine a virtual channel 340 associated with the packet 312. In certain implementations, the virtual channel logic 504 may identify a virtual channel identifier 322 within the packet 312 and may determine the virtual channel 340 based on the virtual channel identifier 322. For example, the virtual channel logic 504 may extract the virtual channel identifier 322 from the packet 312.

The secure domain logic 506 may be configured to determine, based on the virtual channel, a secure domain for the packet. For example, the secure domain logic 506 may determine, based on the virtual channel 340, a secure domain 346 for the packet 312. The secure domain 346 may be selected from a plurality of secure domains 344, 346, 348 accessible via the PHY 314. The secure domain 346 may be identified based on the virtual channel identifier 322. For example, the secure domain logic 506 may identify a secure domain identifier 324 that corresponds to the virtual channel identifier 322 extracted from the packet 312. The secure domain identifier 324 may correspond to the current secure domain 346 for the virtual channel 340.

The secure domain routing logic 508 may be configured to route the packet within the secure domain. For example, the secure domain routing logic 508 may route the packet 312 within the secure domain 346. In certain implementations, routing the packet 312 may include routing contents of the packet 312 to a secure storage 308 implementing the secure domain 346. Routing the packet 312 may also include ensuring that all processing steps for the contents of the packet 312 are performed within the secure domain 346, such as by ensuring that image processing steps read from and write to a corresponding context base 332 for the secure domain 346.

In one or more aspects, techniques for supporting routing of packets received from multiple image sensors to different secure domains may include additional aspects, such as any single aspect or any combination of aspects described below or in connection with one or more other processes or devices described elsewhere herein. In a first aspect, supporting routing of packets received from multiple image sensors to different secure domains may include an apparatus including: an image signal processor; and a memory storing instructions which, when executed by the image signal processor, cause the processor to: receive a packet from an image sensor along a physical data connection; determine a virtual channel associated with the packet; determine, based on the virtual channel, a first secure domain for the packet, wherein the first secure domain is selected from a plurality of secure domains accessible via the physical data connection; and route the packet within the first secure domain. Additionally, the apparatus may perform or operate according to one or more aspects as described below. In some implementations, the apparatus includes a wireless device, such as a UE or BS. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect according to the first aspect, the first secure domain is an isolated data stream that is protected from access by computing processes that are not part of the first secure domain.

In a third aspect according to one or more of the first through second aspects, routing the packet within the first secure domain includes performing image processing on the packet without leaving the first secure domain.

In a fourth aspect according to one or more of the first through third aspects, the apparatus further includes a secure data storage device configured to implement the plurality of secure domains, and wherein the first secure domain is implemented by a first portion of the secure data storage device.

In a fifth aspect according to one or more of the first through fourth aspects, the secure data storage device includes a secure memory management unit (SMMU) configured to restrict access to a secure memory, and wherein routing the packet within the first secure domain includes: providing a first domain identifier for the first secure domain to the SMMU; accessing the first portion of the secure data storage device; and writing the packet to the secure data storage device.

In a sixth aspect according to one or more of the first through fifth aspects, determining the first secure domain includes determining that a first domain identifier corresponds to a virtual channel identifier, wherein the image sensor is one of a plurality of image sensors and the virtual channel identifier identifies the image sensor from among the plurality of image sensors.

In a seventh aspect according to one or more of the first through sixth aspects, the instructions further cause the processor, before receiving the packet, to: receive a request to access the image sensor from an application; determine that the application corresponds to the first secure domain; and determine an association between the virtual channel identifier and the first domain identifier.

In an eighth aspect according to one or more of the first through seventh aspects, the virtual channel was previously used to access a second secure domain from the plurality of secure domains.

In a ninth aspect according to one or more of the first through tenth aspects, the physical data connection is a CSI PHY data connection between a plurality of image sensors and the apparatus.

In a tenth aspect according to one or more of the first through eleventh aspects, the physical data connection is one of a plurality of physical data connections for the apparatus, and wherein at least a subset of the plurality of secure domains are accessible via the plurality of physical data connections.

In an eleventh aspect, supporting routing of packets received from multiple image sensors to different secure domains may include a method that includes receiving, by an image signal processor, a packet from an image sensor along a physical data connection; determining, by the image signal processor, a virtual channel associated with the packet; determining, by the image signal processor based on the virtual channel, a first secure domain for the packet, wherein the first secure domain is selected from a plurality of secure domains accessible via the physical data connection; and routing, by the image signal processor, the packet within the first secure domain.

In a twelfth aspect according to the eleventh aspect, the first secure domain is an isolated data stream that is protected from access by computing processes that are not part of the first secure domain.

In a thirteenth aspect according to one or more of the eleventh through twelfth aspects, routing the packet within the first secure domain includes performing image processing on the packet without leaving the first secure domain.

In a fourteenth aspect according to one or more of the eleventh through thirteenth aspects, the plurality of secure domains are implemented by a secure data storage device, and wherein the first secure domain is implemented by a first portion of the secure data storage device.

In a fifteenth aspect according to one or more of the eleventh through fourteenth aspects, the secure data storage device includes a secure memory management unit (SMMU) configured to restrict access to a secure memory, and wherein routing the packet within the first secure domain includes: providing a first domain identifier for the first secure domain to the SMMU; accessing the first portion of the secure data storage device; and writing the packet to the secure data storage device.

In a sixteenth aspect according to one or more of the eleventh through fifteenth aspects, determining the first secure domain includes determining that a first domain identifier corresponds to a virtual channel identifier, wherein the image sensor is one of a plurality of image sensors and the virtual channel identifier identifies the image sensor from among the plurality of image sensors.

In a seventeenth aspect according to one or more of the eleventh through sixteenth aspects, a method, further including, before receiving the packet: receiving a request to access the image sensor from an application; determining that the application corresponds to the first secure domain; and determining an association between the virtual channel identifier and the first domain identifier.

In an eighteenth aspect according to one or more of the eleventh through seventeenth aspects, the virtual channel was previously used to access a second secure domain from the plurality of secure domains.

In a nineteenth aspect according to one or more of the eleventh through eighteenth aspects, the physical data connection is a shared PHY data connection between a plurality of image sensors and an image signal processor, and wherein the image signal processor is configured to perform the method.

In a twentieth aspect according to one or more of the eleventh through nineteenth aspects, the physical data connection is one of a plurality of physical data connections, and wherein at least a subset of the plurality of secure domains are accessible via the plurality of physical data connections.

In a twenty-first aspect, supporting routing of packets received from multiple image sensors to different secure domains may include a non-transitory, computer-readable medium storing instructions which, when executed by an image signal processor, cause the image signal processor to: receive a packet from an image sensor along a physical data connection; determine a virtual channel associated with the packet; determine, based on the virtual channel, a first secure domain for the packet, wherein the first secure domain is selected from a plurality of secure domains accessible via the physical data connection; and route the packet within the first secure domain.

In a twenty-second aspect according to the twenty-first aspect, the first secure domain is an isolated data stream that is protected from access by computing processes that are not part of the first secure domain.

In a twenty-third aspect according to one or more of the twenty-first through twenty-second aspects, routing the packet within the first secure domain includes performing image processing on the packet without leaving the first secure domain.

In a twenty-fourth aspect according to one or more of the twenty-first through twenty-third aspects, the plurality of secure domains are implemented by a secure data storage device, and wherein the first secure domain is implemented by a first portion of the secure data storage device.

In a twenty-fifth aspect according to one or more of the twenty-first through twenty-fourth aspects, the secure data storage device includes a secure memory management unit (SMMU) configured to restrict access to a secure memory, and wherein routing the packet within the first secure domain includes: providing a first domain identifier for the first secure domain to the SMMU; accessing the first portion of the secure data storage device; and writing the packet to the secure data storage device.

In a twenty-sixth aspect, supporting routing of packets received from multiple image sensors to different secure domains may include an image capture device including: a first image sensor; a second image sensor; an image signal processor; a first shared physical link coupling the first image sensor to the image signal processor and coupling the second image sensor to the image signal processor; and a memory storing instructions which, when executed by the image signal processor, cause the image signal processor to: receive a packet from an image sensor along a physical data connection; determine a virtual channel associated with the packet; determine, based on the virtual channel, a first secure domain for the packet, wherein the first secure domain is selected from a plurality of secure domains accessible via the physical data connection; and route the packet within the first secure domain.

In a twenty-seventh aspect according to the twenty-sixth aspect, the first secure domain is an isolated data stream that is protected from access by computing processes that are not part of the first secure domain.

In a twenty-eighth aspect according to one or more of the twenty-sixth through twenty-seventh aspects, routing the packet within the first secure domain includes performing image processing on the packet without leaving the first secure domain.

In a twenty-ninth aspect according to one or more of the twenty-sixth through twenty-eighth aspects, an image capture device, further including a secure data storage device configured to implement the plurality of secure domains, and wherein the first secure domain is implemented by a first portion of the secure data storage device.

In a thirtieth aspect according to one or more of the twenty-sixth through twenty-ninth aspects, the secure data storage device includes a secure memory management unit (SMMU) configured to restrict access to a secure memory, and wherein routing the packet within the first secure domain includes: providing a first domain identifier for the first secure domain to the SMMU; accessing the first portion of the secure data storage device; and writing the packet to the secure data storage device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-5 include processors, electronics devices, hardware devices, electronics components, logical circuits, memories, software codes, or firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill in the art that one or more blocks (or operations) described with reference to FIGS. 4 and 5 may be combined with one or more blocks (or operations) described with reference to another one of the figures. For example, one or more blocks (or operations) of FIG. 4 may be combined with one or more blocks (or operations) of FIGS. 1-3. As another example, one or more blocks associated with FIG. 5 may be combined with one or more blocks (or operations) associated with FIGS. 1-4.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally, in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles, and the novel features disclosed herein.

Additionally, a person having ordinary skill in the art will readily appreciate that opposing terms such as "upper" and "lower," or "front" and "back," or "top" and "bottom," or "forward" and "backward" are sometimes used for ease of describing the figures and indicate relative positions corresponding to the orientation of the figure on a properly oriented page and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may, in some cases, be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes. 1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus comprising:
an image signal processor; and
a memory storing instructions which, when executed by the image signal processor, cause the processor to:
receive a packet from an image sensor along a physical data connection;
determine a virtual channel associated with the packet;
determine, based on the virtual channel, a first secure domain for the packet, wherein the first secure domain is selected from a plurality of secure domains accessible via the physical data connection, wherein determining the first secure domain includes determining that a first domain identifier for the first secure domain corresponds to a virtual channel identifier, wherein the image sensor is one of a plurality of image sensors and the virtual channel identifier identifies the image sensor from among the plurality of image sensors; and
route the packet within the first secure domain.

2. The apparatus of claim 1, wherein the first secure domain is an isolated data stream that is protected from access by computing processes that are not part of the first secure domain.

3. The apparatus of claim 2, wherein routing the packet within the first secure domain includes performing image processing on the packet without leaving the first secure domain.

4. The apparatus of claim 1, wherein the apparatus further includes a secure data storage device configured to implement the plurality of secure domains, and wherein the first secure domain is implemented by a first portion of the secure data storage device.

5. The apparatus of claim 4, wherein the secure data storage device includes a secure memory management unit (SMMU) configured to restrict access to a secure memory, and wherein routing the packet within the first secure domain comprises:
providing the first domain identifier for the first secure domain to the SMMU;
accessing the first portion of the secure data storage device; and
writing the packet to the secure data storage device.

6. The apparatus of claim 1, wherein the instructions further cause the processor, before receiving the packet, to:
receive a request to access the image sensor from an application;
determine that the application corresponds to the first secure domain; and
determine an association between the virtual channel identifier and the first domain identifier.

7. The apparatus of claim 1, wherein the virtual channel was previously used to access a second secure domain from the plurality of secure domains.

8. The apparatus of claim 1, wherein the physical data connection is a channel state information (CSI) physical layer (PHY) data connection between a plurality of image sensors and the apparatus.

9. The apparatus of claim 1, wherein the physical data connection is one of a plurality of physical data connections for the apparatus, and wherein at least a subset of the plurality of secure domains are accessible via the plurality of physical data connections.

10. A method, comprising:
receiving, by an image signal processor, a packet from an image sensor along a physical data connection;
determining, by the image signal processor, a virtual channel associated with the packet;
determining, by the image signal processor based on the virtual channel, a first secure domain for the packet, wherein the first secure domain is selected from a plurality of secure domains accessible via the physical data connection, wherein determining the first secure domain includes determining that a first domain identifier corresponds to a virtual channel identifier, wherein the image sensor is one of a plurality of image sensors and the virtual channel identifier identifies the image sensor from among the plurality of image sensors; and
routing, by the image signal processor, the packet within the first secure domain.

11. The method of claim 10, wherein the first secure domain is an isolated data stream that is protected from access by computing processes that are not part of the first secure domain.

12. The method of claim 11, wherein routing the packet within the first secure domain includes performing image processing on the packet without leaving the first secure domain.

13. The method of claim 10, wherein the plurality of secure domains are implemented by a secure data storage device, and wherein the first secure domain is implemented by a first portion of the secure data storage device.

14. The method of claim 13, wherein the secure data storage device includes a secure memory management unit (SMMU) configured to restrict access to a secure memory, and wherein routing the packet within the first secure domain comprises:
providing the first domain identifier for the first secure domain to the SMMU;
accessing the first portion of the secure data storage device; and
writing the packet to the secure data storage device.

15. The method of claim 10, further comprising, before receiving the packet:
receiving a request to access the image sensor from an application;
determining that the application corresponds to the first secure domain; and
determining an association between the virtual channel identifier and the first domain identifier.

16. The method of claim 10, wherein the virtual channel was previously used to access a second secure domain from the plurality of secure domains.

17. The method of claim 10, wherein the physical data connection is a shared physical layer (PHY) data connection between a plurality of image sensors and an image signal processor, and wherein the image signal processor is configured to perform the method.

18. The method of claim 10, wherein the physical data connection is one of a plurality of physical data connections, and wherein at least a subset of the plurality of secure domains are accessible via the plurality of physical data connections.

19. A non-transitory, computer-readable medium storing instructions which, when executed by an image signal processor, cause the image signal processor to:
receive a packet from an image sensor along a physical data connection;
determine a virtual channel associated with the packet;
determine, based on the virtual channel, a first secure domain for the packet, wherein the first secure domain is selected from a plurality of secure domains accessible via the physical data connection, wherein determining the first secure domain includes determining that a first domain identifier for the first secure domain corresponds to a virtual channel identifier, wherein the image sensor is one of a plurality of image sensors and the virtual channel identifier identifies the image sensor from among the plurality of image sensors; and route the packet within the first secure domain.

20. The non-transitory, computer-readable medium of claim 19, wherein the first secure domain is an isolated data stream that is protected from access by computing processes that are not part of the first secure domain.

21. The non-transitory, computer-readable medium of claim 20, wherein routing the packet within the first secure domain includes performing image processing on the packet without leaving the first secure domain.

22. The non-transitory, computer-readable medium of claim 19, wherein the plurality of secure domains are implemented by a secure data storage device, and wherein the first secure domain is implemented by a first portion of the secure data storage device.

23. The non-transitory, computer-readable medium of claim 22, wherein the secure data storage device includes a secure memory management unit (SMMU) configured to restrict access to a secure memory, and wherein routing the packet within the first secure domain comprises:

providing a first domain identifier for the first secure domain to the SMMU;

accessing the first portion of the secure data storage device; and writing the packet to the secure data storage device.

24. An image capture device comprising:

a first image sensor;

a second image sensor;

an image signal processor;

a first shared physical link coupling the first image sensor to the image signal processor and coupling the second image sensor to the image signal processor; and a memory storing instructions which, when executed by the image signal processor, cause the image signal processor to:

receive a packet from an image sensor along a physical data connection;

determine a virtual channel associated with the packet;

determine, based on the virtual channel, a first secure domain for the packet, wherein the first secure domain is selected from a plurality of secure domains accessible via the physical data connection, wherein determining the first secure domain includes determining that a first domain identifier for the first secure domain corresponds to a virtual channel identifier, wherein the image sensor is one of a plurality of image sensors and the virtual channel identifier identifies the image sensor from among the plurality of image sensors; and route the packet within the first secure domain.

25. The image capture device of claim 24, wherein the first secure domain is an isolated data stream that is protected from access by computing processes that are not part of the first secure domain.

26. The image capture device of claim 25, wherein routing the packet within the first secure domain includes performing image processing on the packet without leaving the first secure domain.

27. The image capture device of claim 24, further comprising a secure data storage device configured to implement the plurality of secure domains, and wherein the first secure domain is implemented by a first portion of the secure data storage device.

28. The image capture device of claim 27, wherein the secure data storage device includes a secure memory management unit (SMMU) configured to restrict access to a secure memory, and wherein routing the packet within the first secure domain comprises:

providing a first domain identifier for the first secure domain to the SMMU;

accessing the first portion of the secure data storage device; and writing the packet to the secure data storage device.

* * * * *